(12) United States Patent
Vichniakov et al.

(10) Patent No.: US 7,207,756 B2
(45) Date of Patent: Apr. 24, 2007

(54) SEAT MOUNTING RAIL, PARTICULARLY FOR A COMMERCIAL AIRCRAFT

(75) Inventors: Alexei Vichniakov, Bahrendorf (DE); Herwig Assler, Hollern Twielenfleth (DE)

(73) Assignee: Airbus Deutschland GmbH, Hamburg (DE)

( * ) Notice: Subject to any disclaimer, the term of this patent is extended or adjusted under 35 U.S.C. 154(b) by 119 days.

(21) Appl. No.: 11/018,588

(22) Filed: Dec. 20, 2004

(65) Prior Publication Data

US 2005/0156095 A1 Jul. 21, 2005

(30) Foreign Application Priority Data

Dec. 19, 2003 (DE) ................. 103 60 809

(51) Int. Cl.
*B61D 45/00* (2006.01)
(52) U.S. Cl. ..................................... 410/115
(58) Field of Classification Search ............... 410/115, 410/101, 96
See application file for complete search history.

(56) References Cited

U.S. PATENT DOCUMENTS

| | | | | |
|---|---|---|---|---|
| RE21,921 E | * | 10/1941 | Jacobs et al. ............... 52/729.2 |
| 3,596,421 A | * | 8/1971 | Miller ........................... 52/333 |
| 3,642,054 A | * | 2/1972 | Nowak ........................ 164/461 |
| 4,475,701 A | | 10/1984 | Martin |
| 4,723,732 A | * | 2/1988 | Gorges ..................... 244/118.6 |
| 4,856,738 A | * | 8/1989 | Martin .................... 244/122 R |
| 4,869,421 A | * | 9/1989 | Norris et al. ................ 228/181 |
| 5,688,426 A | * | 11/1997 | Kirkwood et al. ........... 219/633 |
| 6,068,214 A | * | 5/2000 | Kook et al. ............... 244/118.1 |
| 6,498,297 B2 | | 12/2002 | Samhammer |
| 6,554,225 B1 | * | 4/2003 | Anast et al. ............. 244/117 R |
| 7,100,885 B2 | * | 9/2006 | Zerner ...................... 248/503.1 |
| 2003/0124821 A1 | * | 7/2003 | Robertson .................... 438/514 |
| 2005/0133666 A1 | | 6/2005 | Zerner |
| 2005/0211844 A1 | * | 9/2005 | Ricaud .................... 244/122 R |
| 2006/0088725 A1 | * | 4/2006 | Ruggiero et al. ........... 428/650 |

FOREIGN PATENT DOCUMENTS

| | | |
|---|---|---|
| DE | 42 24 821 | 2/1994 |
| DE | 198 02 542 | 8/1999 |
| EP | 0 922 632 | 6/1999 |
| FR | 2864940 A1 * | 7/2005 |
| GB | 2 320 183 | 6/1998 |
| RU | 2 136 548 | 9/1999 |

OTHER PUBLICATIONS

Aluminum Standards and Data, Sixth Edition, Mar. 1979, Alloy and Temper Designation Systems for Aluminum (ANSI H35.1—1978), pp. 7 to 15.

* cited by examiner

*Primary Examiner*—H Gutman
(74) *Attorney, Agent, or Firm*—W. F. Fasse; W. G. Fasse

(57) ABSTRACT

A seat mounting rail suitable for mounting passenger seats to a floor, for example an aircraft cabin floor, is divided into an upper section for securing a seat and a lower section for mounting the rail to the floor. The upper section is preferably made of a titanium alloy. The lower section is preferably made of an aluminum alloy. Both sections are connected to each other by an interconnection preferably in the form of a metallurgical bond formed under heat and pressure. A bonding metal foil compatible with the metals of which the rail sections are made is used for enhancing the bonding strength of the interconnection.

14 Claims, 2 Drawing Sheets

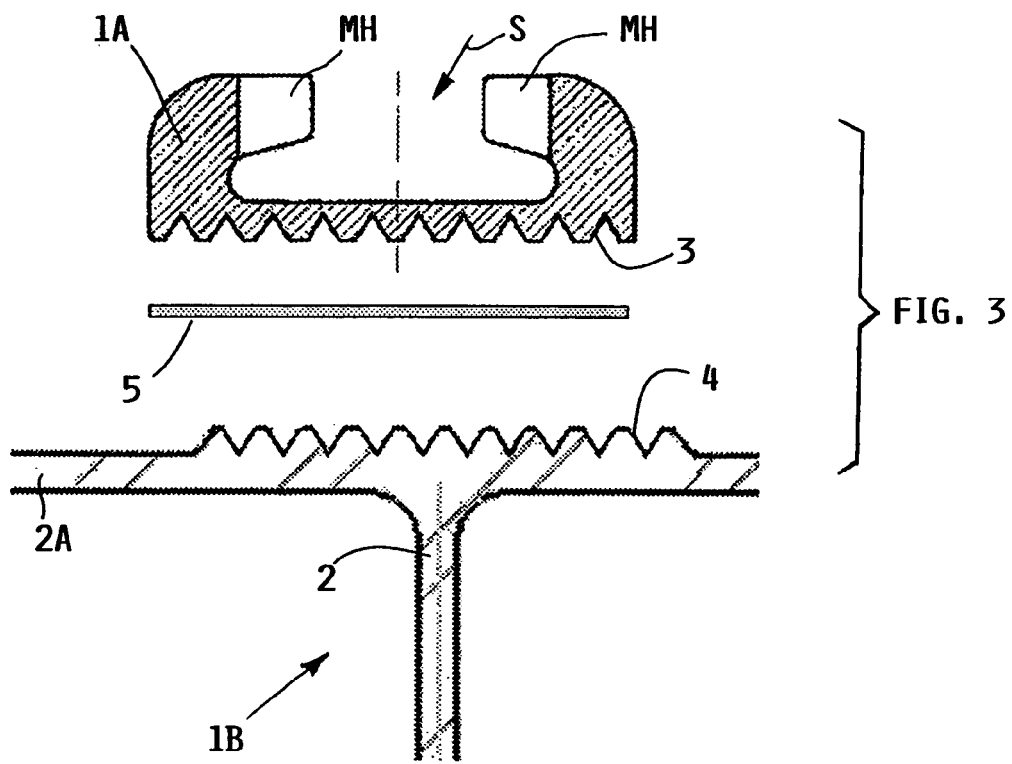
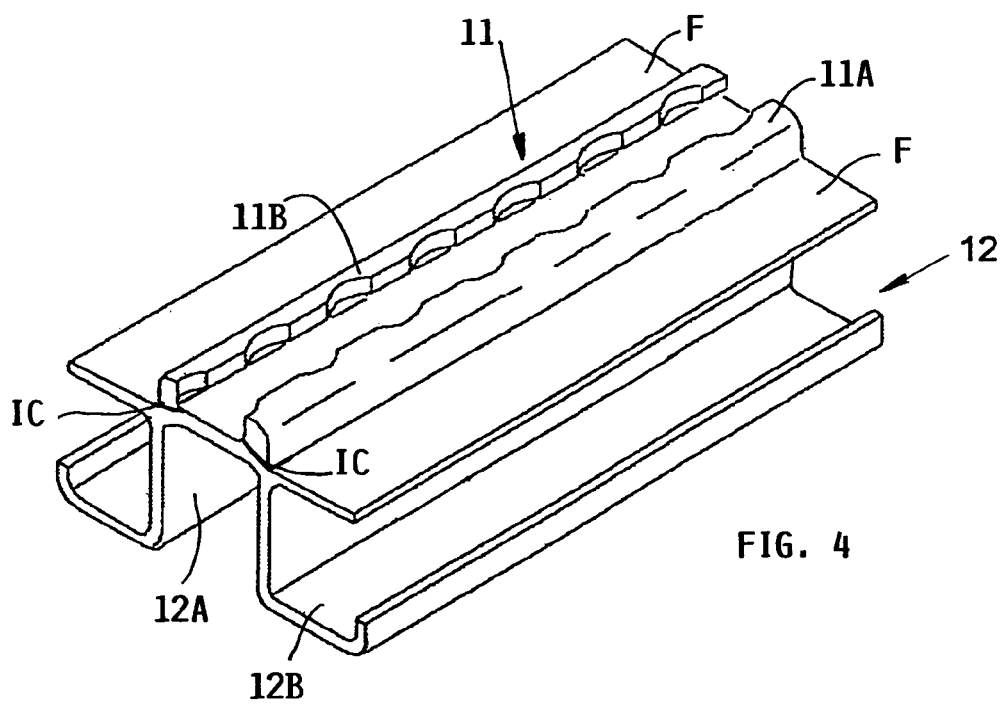

SEAT MOUNTING RAIL, PARTICULARLY FOR A COMMERCIAL AIRCRAFT

PRIORITY CLAIM

This application is based on and claims the priority under 35 U.S.C. §119 of German Patent Application 103 60 809.5, filed on Dec. 19, 2003, the entire disclosure of which is incorporated herein by reference.

FIELD OF THE INVENTION

The invention relates to a seat mounting rail for securing passenger seats to the cabin floor of a commercial airliner. Such rails have a lower portion for securing to the floor and an upper portion for securing seats to the rail. Such rails may also be used for securing loads to a floor.

BACKGROUND INFORMATION

Mounting rails for securing passenger seats in commercial aircraft are normally standardized. One such standard defining sheets is, for example, air traffic standard LN 29 890. The standard construction of such rails includes a lower mounting rail section having an Ω- or a T-cross-sectional configuration. A chair securing upper rail section includes a C-cross-sectional configuration that opens upwardly into the cabin, whereby the upwardly facing opening is bounded on both sides by two flanges that reach toward and face each other to form a slot. The slot has spaced bores for the insertion of a seat footing. The seat securing upper section with the C-cross-sectional configuration and the rail mounting lower section are conventionally made of the same metal and are provided for example as extruded or milled stock.

Such chair mounting rails for the releasable securing of seats and other items in the C-portion of the upper rail section have standardized dimensions. German Patent Publication DE 42 24 821 A1 describes such a seat mounting rail. Further, Russian Patent RU 2,136,548 C1 discloses a device for the securing of passenger seats in which the mounting rail comprises edge shaped elements for the securing of the passenger seats in the mounting rail. US Patent Publication U.S. Pat. No. 6,554,225 B1 discloses an arrangement of mounting rails in a lightweight floor construction for an aircraft. The floor is constructed for mounting rails having a T-cross-sectional configuration in the floor structure of an aircraft.

Mounting rails used in the known constructions are generally made of a high strength aluminum alloy with due regard to weight considerations. High strength aluminum alloys of the aluminum-zinc-group are particularly suitable for manufacturing conventional seat mounting rails. These aluminum zinc alloys are also referred to as so-called 7XXX alloys which have a high mechanical strength. Thus, these alloys have been recognized as particularly suitable for manufacturing seat mounting rails which are exposed to high mechanical loads in an aircraft structure.

However, it has been found that satisfying mechanical characteristics alone is not entirely satisfactory since other characteristics are also required. For example, a resistance against corrosion is important for seat mounting rails in an aircraft since the floor in the aircraft cabin is exposed to a multitude of corrosive influences or loads such as spilled liquids, condensed moisture, and the like. A possible measure for preventing corrosion of the seat mounting rails is the use of additional rail coverings as is disclosed in U.S. Pat. No. 6,498,297 B2 and U.S. Pat. No. 4,457,701. Another possibility of protecting seat mounting rails against corrosion is to increase the corrosion resistance of the rail material itself. This approach requires using corrosion resistant materials for manufacturing the rails. Thus it is known to make the entire seat mounting rail of high strength titanium alloys, particularly as defined in the alloy material Ti-6Al-4V.

The use of titanium alloys for manufacturing seat mounting rails clearly has the advantage of a material highly resistant to corrosion. However, titanium alloys are substantially more expensive than aluminum alloys and additionally have a higher density than aluminum alloys which is not advantageous with regard to the constant need for weight reductions in the manufacture of commercial aircraft. More specifically, a seat mounting rail of a titanium alloy is about 30% heavier than a comparable seat mounting rail made of a high strength aluminum alloy. As a result, seat rails made of high strength titanium alloys increase the overall floor weight of a commercial aircraft by several hundred kilograms. At the same time, the use of seat mounting rails made of titanium alloys makes the floor structure substantially more expensive so that the described solution of the corrosion problem is economically not acceptable. More specifically, solving the corrosion problem by a titanium seat mounting rail which is about ten times more expensive than a comparable conventional aluminum alloy rail is not acceptable.

OBJECTS OF THE INVENTION

In view of the foregoing it is the aim of the invention to achieve the following objects singly or in combination:
  to solve the above outlined corrosion problem by a seat mounting rail having excellent mechanical and corrosion resistance characteristics while substantially avoiding the cost and weight problems encountered with rails made entirely of titanium; and
  to construct the mounting rail of a lightweight mounting section and a corrosion resistant seat securing section, whereby both sections are to be bonded together; and
  keeping the weight of the two section or two component rail within acceptable limits.

The invention further aims to avoid or overcome the disadvantages of the prior art, and to achieve additional advantages, as apparent from the present specification. The attainment of these objects is, however, not a required limitation of the claimed invention.

SUMMARY OF THE INVENTION

The above objects have been achieved according to the invention by a seat mounting rail for securing seats to a floor of a commercial aircraft, wherein the seat mounting rail has a seat securing upper section and a rail mounting lower section, wherein the upper section and the lower section are made of different materials and wherein the upper and lower mounting rail sections are secured to each other by an interconnection which preferably.

In a preferred embodiment the profiled seat securing upper section is made of a titanium alloy, while the rail mounting lower section is made of an aluminum alloy particularly a high strength aluminum alloy, and both sections are interconnected by a homogenous metallurgical interconnection or bonding resulting in a compound two component construction. The metallurgical interconnection need not add any or very little extra metal material for its formation.

Making the seat mounting upper section of a titanium alloy has the advantage of solving the corrosion problem without the need for making the entire rail of titanium alloy. Making the lower mounting section of the rail of a high strength aluminum alloy has the advantage of avoiding an unnecessary weight increase. Simultaneously, the seat mounting rails according to the invention are substantially less expensive compared to a seat mounting rail made entirely of a corrosion resistant titanium alloy.

The interconnection between the upper titanium alloy section having a, for example a C-sectional configuration, with the lower mounting section of an aluminum alloy is preferably accomplished by pressing the two sections against each other at an elevated temperature of at least 50° C., while simultaneously applying a pressure of at least 10 MPa. In order to increase the bonding strength or interconnection strength, one or both sections may have surface increasing features in or on the surface areas that face each other for making the bonding interconnection. One or both surface areas may be provided with serrations to increase the surface area for the bonding. A bonding enhancing foil of metal may be inserted between the two seat mounting rail sections without serrations or in combination with serrations on one or both facing surfaces. These foils increase the bonding strength of the metallurgical interconnection.

BRIEF DESCRIPTION OF THE DRAWINGS

In order that the invention may be clearly understood, it will now be described in connection with example embodiments thereof, with reference to the accompanying drawings, wherein:

FIG. 3 is an exploded, sectional view of two rail sections prior to forming the interconnection with surface area increasing features; and FIG. 4 shows a seat mounting rail according to the invention with a lower section formed substantially as an Ω-cross-sectional configuration with additional laterally extending flanges.

DETAILED DESCRIPTION OF A PREFERRED EXAMPLE EMBODIMENT AND OF THE BEST MODE OF THE INVENTION

Figure 1:
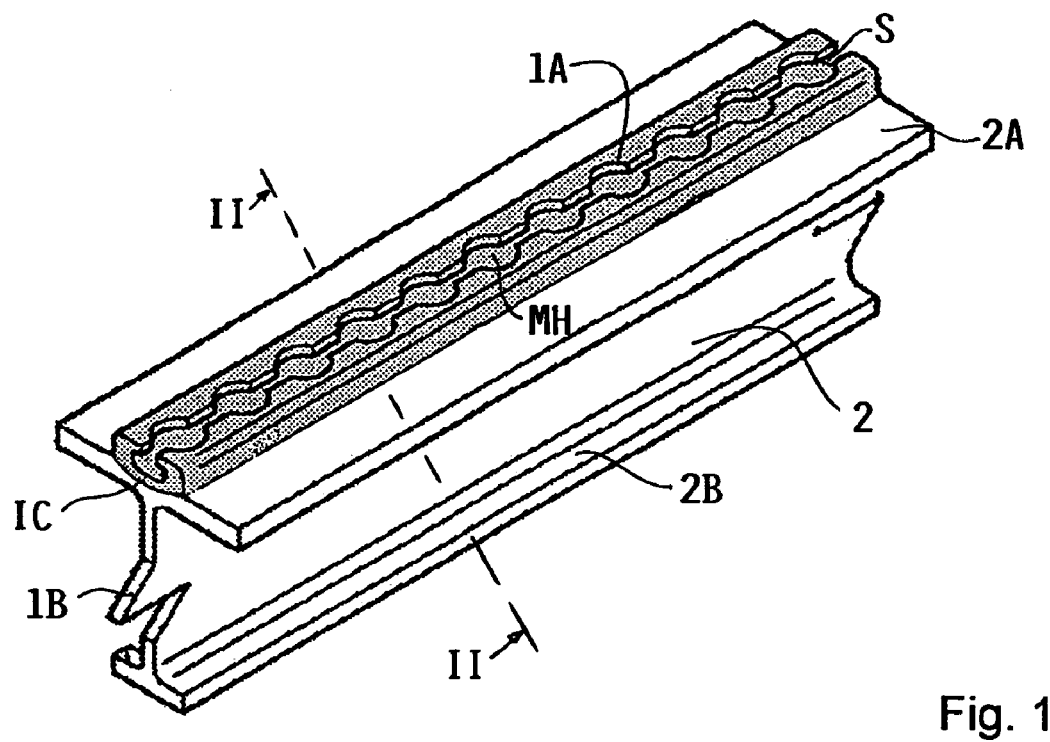
FIG. 1 is a perspective view of a seat mounting rail according to the invention having substantially a T-cross-sectional configuration.
Figure 2:
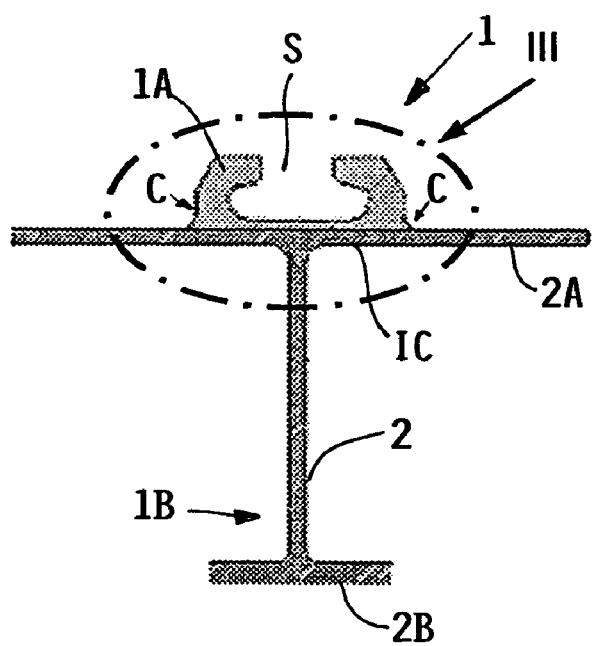
FIG. 2 is a sectional view along section plane II—II in FIG. 1.

FIGS. 1 and 2 show a seat mounting rail 1 according to the invention. The rail 1 has an upper seat securing rail section 1A and a lower mounting rail section 1B. The mounting section 1B has a web 2, a top cord 2A and a narrower bottom or foot cord 2B. According to the invention the seat securing upper section 1A is secured to the top cord 2A by a bonding, preferably a metallurgical bond forming an interconnection IC between the upwardly facing surface area of the top cord 2A and the downwardly facing surface area of the upper rail section 1A. The upper rail section 1A has an approximate C-sectional configuration with the open slot S facing upwardly. The open slot S is interrupted at intervals by mounting holes MH. The contact surface area and thus the interconnection area between both sections 1A and 1B may be increased, for example, by forming a crown in one section and a trough in the other section as seen in FIG. 1.

According to the invention the upper rail section 1A is made of a corrosion resistant material such as a titanium alloy while the lower section 1B is made of a high strength aluminum alloy. The interconnection IC between the two sections 1A and 1B is preferably a metallurgical bonding produced under a pressure of at least 10 MPa, preferably at temperatures of at least 50° C. Both the titanium alloy and the aluminum alloy are high strength alloys whereby for example the titanium alloy may be of the type Ti-6Al-4V while the high strength aluminum alloy is of the type AA 7475.

FIG. 3 illustrates another example of increasing of the surface area of the interconnection IC, for example by a serration 3 in the downwardly facing surface of the rail section 1A and another serration 4 in the upwardly facing surface of the mounting rail section 1B. In a modified version the interconnection strength can be further improved by inserting a metal foil 5 between the two surfaces to be metallurgically bonded to each other. At least one of the surface areas to be bonded to each other is preferably provided with a surface area increasing feature. However, the metal foil 5 can be used either with surface area increasing features or without such features or with such features on at least one of the surfaces to be bonded to each other. The foil 5 is preferably made of an aluminum alloy or a titanium alloy or a niobium alloy. Rather than making the lower mounting section 1B of an aluminum alloy, the same advantages particularly with regard to weight reductions are achieved by making the lower section 1B of a high strength magnesium alloy.

FIG. 4 shows a seat mounting rail 12 according to the invention. The mounting rail 12 has two lower mounting portions 12A, 12B forming a lower mounting section having an Ω-sectional configuration made of a lightweight high strength material and an upper section 11 for mounting seats made of a corrosion resistance high strength material other than the material of which the lower section 12A, 12B is made. The upper seat securing section 11 has two portions 11A and 11B each with a flange F secured to the lower rail mounting section 12 at the interconnections IC which are high strength bonding areas between the sections 11A, 11B and the flanges on the one hand and the upwardly facing surface of the lower section 12 along the flanges F. Preferably, a metallurgical bond is formed as described above with reference to FIG. 3.

In all instances the upper seat securing sections 11A and 11B and the flanges F are preferably made out of a high strength titanium alloy while the lower section 12 is made of a high strength aluminum or magnesium alloy. Further, the interconnections IC may be made in all instances as a diffusion interconnection or bonding achieved by the above mentioned pressurization under increased temperatures.

In all embodiments, at least the interconnection areas IC should be protected against corrosion by a respective coating C along the seams of the interconnection in order to avoid corrosion due to different electrochemical potentials between the sections of different materials. Such coatings should protect particularly the interconnection IC against contact with corrosive media.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A seat mounting rail for securing seats to a floor of an aircraft, said seat mounting rail comprising a seat securing upper rail section and a rail mounting lower rail section, wherein said upper rail section and said lower rail section are made of different materials, said mounting rail further comprising a metallurgical interconnection between said upper and lower rail sections.

2. The seat mounting rail of claim 1, wherein said upper rail section is made of a titanium alloy.

3. The seat mounting rail of claim 1, wherein said lower rail section is made of any one of an aluminum alloy and a magnesium alloy.

4. The seat mounting rail of claim 1, wherein said interconnection includes as part of said interconnection a bonding enhancing element.

5. The seat mounting rail of claim 4, wherein said bonding enhancing element is a surface area increasing element for increasing the strength of said interconnection.

6. The seat mounting rail of claim 5, wherein said surface area increasing element is a serration of at least one of said upper and lower rail sections.

7. The seat mounting rail of claim 3, wherein said bonding enhancing element is an intermediate metal foil (5) inserted between said upper and lower rail sections for increasing a strength of said interconnection being a metallurgical connection or bond formed between said upper and lower rail sections.

8. The seat mounting rail of claim 7, wherein said metal foil is made of any one of aluminum, aluminum alloys, titanium, titanium alloys, and niobium alloys.

9. A method for producing the seat mounting rail of claim 1, said method comprising the following steps:
 a) separately preparing said seat securing upper rail section of a corrosion resistant first material;
 b) separately preparing said rail mounting lower rail section of a second material; and
 c) forming said metallurgical interconnection between said upper and lower rail sections by applying a bonding pressure of at least 10 MPa to said upper and lower rail sections.

10. The method of claim 9, further comprising heating said upper and lower rail sections to at least 50° C. while applying said bonding pressure.

11. The method of claim 9, further comprising selecting said first and second materials as first and second metals, inserting a bonding metal foil between said upper rail section and said lower rail section and then forming said interconnection by exposing said bonding metal foil to said bonding pressure of at least 10 MPa.

12. The method of claim 11, further comprising selecting said first metal as a titanium alloy, said second metal as an aluminum alloy, and said bonding metal foil as any one of an aluminum material, a titanium material and a niobium material.

13. The method of claim 11, further comprising heating said bonding metal foil to at least 50° C. while applying said bonding pressure of at least 10 Mpa.

14. A mounting rail for securing seats to a floor of an aircraft, said mounting rail comprising a seat securing upper rail section and a rail mounting lower rail section, wherein said upper rail section is made of a titanium alloy and wherein said lower rail section is made of a material different from said titanium alloy, said mounting rail further comprising an interconnection between said upper and lower rail sections.

* * * * *

UNITED STATES PATENT AND TRADEMARK OFFICE
CERTIFICATE OF CORRECTION

PATENT NO. : 7,207,756 B2
APPLICATION NO. : 11/018588
DATED : April 24, 2007
INVENTOR(S) : Vichniakov et al.

Page 1 of 1

It is certified that error appears in the above-identified patent and that said Letters Patent is hereby corrected as shown below:

Column 5,
Line 20, after "claim", replace "3" by --4--.

Signed and Sealed this

Fourth Day of March, 2008

JON W. DUDAS
*Director of the United States Patent and Trademark Office*